United States Patent
Lundqvist

(12) United States Patent (10) Patent No.: US 6,520,209 B1
(45) Date of Patent: Feb. 18, 2003

(54) DEVICE IN A VALVE

(75) Inventor: Per Lundqvist, Europing (SE)

(73) Assignee: NAF Industries AB, Linkoping (SE)

( * ) Notice: Subject to any disclaimer, the term of this patent is extended or adjusted under 35 U.S.C. 154(b) by 0 days.

(21) Appl. No.: 09/980,269

(22) PCT Filed: May 11, 2000

(86) PCT No.: PCT/SE00/00931
§ 371 (c)(1),
(2), (4) Date: Nov. 30, 2001

(87) PCT Pub. No.: WO00/73685
PCT Pub. Date: Dec. 7, 2000

(30) Foreign Application Priority Data

Jun. 1, 1999 (SE) ................................. 9902028

(51) Int. Cl.$^7$ ................................. F16K 5/06
(52) U.S. Cl. ................................. 137/625.31; 251/127
(58) Field of Search ....................... 251/315.01, 315.16, 251/127; 137/625.31

(56) References Cited

U.S. PATENT DOCUMENTS

| | | | | |
|---|---|---|---|---|
| 4,540,025 A | * | 9/1985 | Ledeen et al. | 251/127 |
| 4,610,273 A | * | 9/1986 | Bey | 251/127 |
| 5,180,139 A | * | 1/1993 | Gethmann et al. | 251/127 |
| 5,218,984 A | * | 6/1993 | Allen | 137/625.31 |
| 5,400,825 A | * | 3/1995 | Gethmann et al. | |
| 5,680,889 A | * | 10/1997 | Boger | 137/625.32 |
| 5,758,689 A | | 6/1998 | Leinen | |
| 6,029,702 A | * | 2/2000 | Leinen et al. | 137/625.32 |

FOREIGN PATENT DOCUMENTS

| | | |
|---|---|---|
| EP | 0043188 | 1/1982 |
| EP | 0831262 | 3/1998 |
| WO | 88/05880 | 2/1987 |

OTHER PUBLICATIONS

International Search Report, dated Sep. 11, 2000.

* cited by examiner

Primary Examiner—Henry C. Yuen
Assistant Examiner—John Bastianelli
(74) Attorney, Agent, or Firm—Merchant & Gould, P.C.

(57) ABSTRACT

A valve (1) has a valve housing (2) with an inlet (3) and outlet (4), a valve body (5), provided with an essentially cylindrical passage (6) and pivotally mounted in the housing (2). Essentially plane walls, defining chambers between them and provided with through openings (11; 11') are arranged in the passage (6). Upon opening the valve the inlet connects solely with one chamber, which via wall openings and intermediate chambers connects with the chamber opposite and the latter with the outlet. During the successive opening sequence of the valve more and more chambers and finally all chambers are made to connect with the inlet and the outlet respectively. The device has at least one pair of intersecting walls (8a, 8b; 9a, 9b, 10a, 10b). These are located in the passage (6), so that two opposing chambers (K1, K4; k1, k9) situated nearest to the inlet (3) and the outlet (4) respectively lie symmetrically in relation to a center plane, in which the central axis (6a) of the passage is situated during the rotational movement vice-versa (5) between the opened and the closed position and vice-versa.

7 Claims, 4 Drawing Sheets

DEVICE IN A VALVE

BACKGROUND OF THE INVENTION

It is known that in valves of the said type cavitation and high noise levels occur in the event of large pressure gradients in liquids.

Devices have been disclosed, for example in the European patent applications No. 87901700.2 and No. 81302496.5, which are intended to reduce the propensity to cavitation and thereby the noise level. The said devices are relatively complicated to manufacture, however, and therefore costly.

SUMMARY OF THE INVENTION

The object of the present invention is to produce a device of the said type that represents a simplification compared to the prior art.

The device according to the invention affords a number of advantages. In manufacturing terms it is very easy to achieve high stability through the combination of intersecting walls provided with through openings. This greatly reduces the risk of vibrations occurring as a result of pressure gradients over the walls. Incoming flows, moreover, are divided up symmetrically and the divided flows "collide" with one another immediately in front of the outlet. This collision gives rise to a further pressure gradient, whilst valve damage is minimised even if cavitation should occur, due to the fact the pressure gradient is absorbed by the actual collision and consequently to a lesser extent by the valve material. In the fully opened position an approximately symmetrical flow through the valve is achieved with ensuing good noise-reducing characteristics and low pressure gradient in this position.

BRIEF DESCRIPTION OF THE DRAWINGS

The invention will be described in more detail below with reference to the attached drawing in which FIG. 1a in a diagrammatic plan view shows a valve and FIG. 1b shows a longitudinal section B—B through the valve in FIG. 1a.

FIG. 3b shows an example of a wall according to FIG. 3a.

DETAILED DESCRIPTION OF THE EMBODIMENTS

Figure 1A:
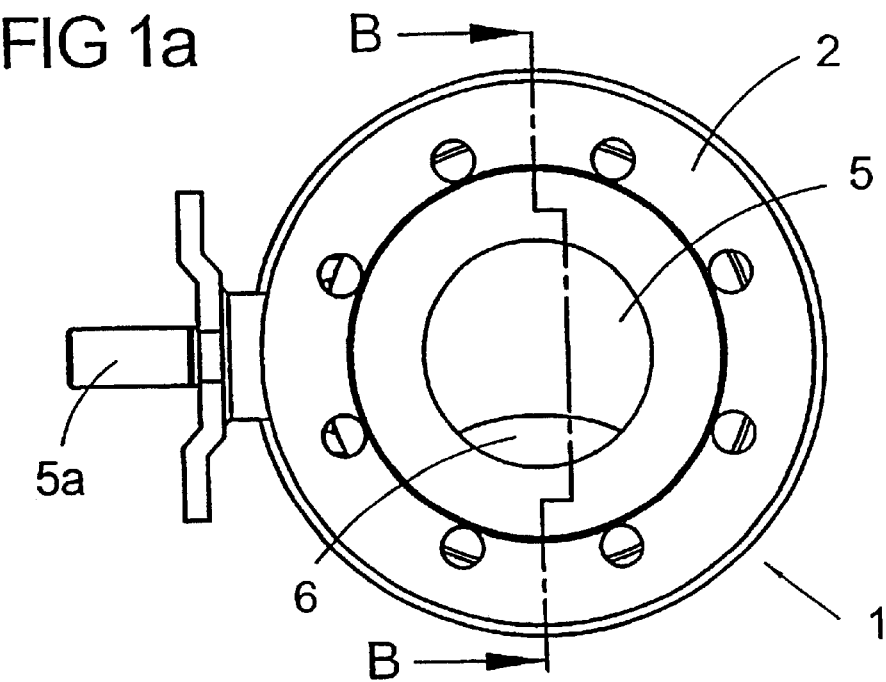
Figure 1B:
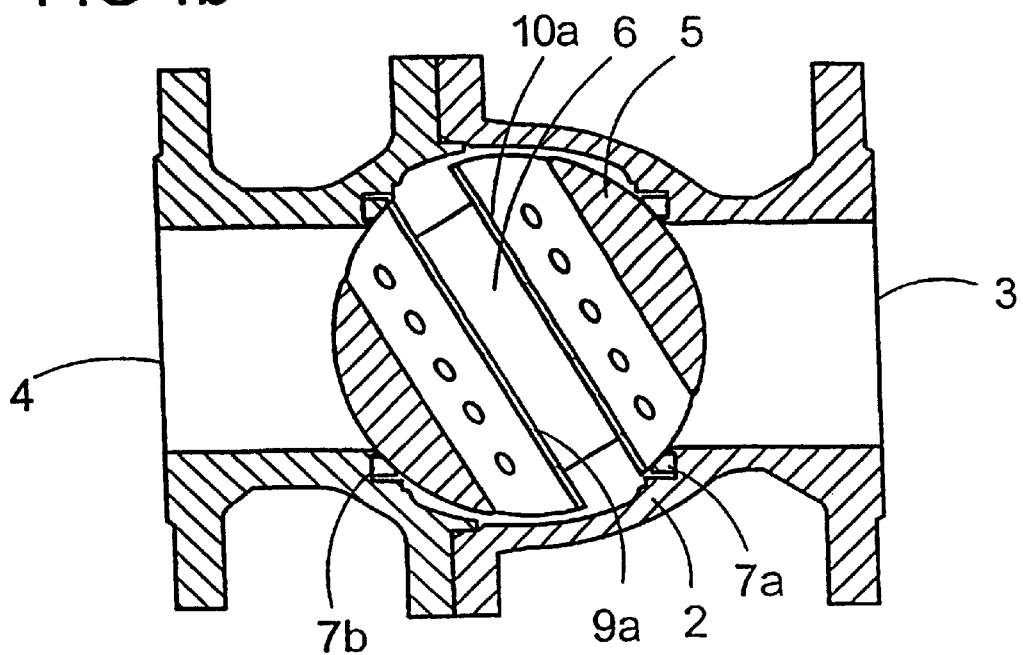

A ball valve 1 comprises a valve housing 2 with inlet 3 and outlet 4 arranged on opposite sides thereof. A valve body 5 with an essentially cylindrical passage 6 is pivotally mounted inside the housing 2. FIG. 1a shows a shaft 5a connected to the valve body 5 for operation of the valve body 5. In the fully open position of the valve 1, the inlet 3 and outlet 4 and the passage are situated in line with one another. FIG. 1b also shows two ring seals 7a, 7b that provide sealing between inlet 3 and outlet 4 respectively and the valve body 5. The person skilled in the art will appreciate that in certain applications only one seal is required.

Figure 2A:
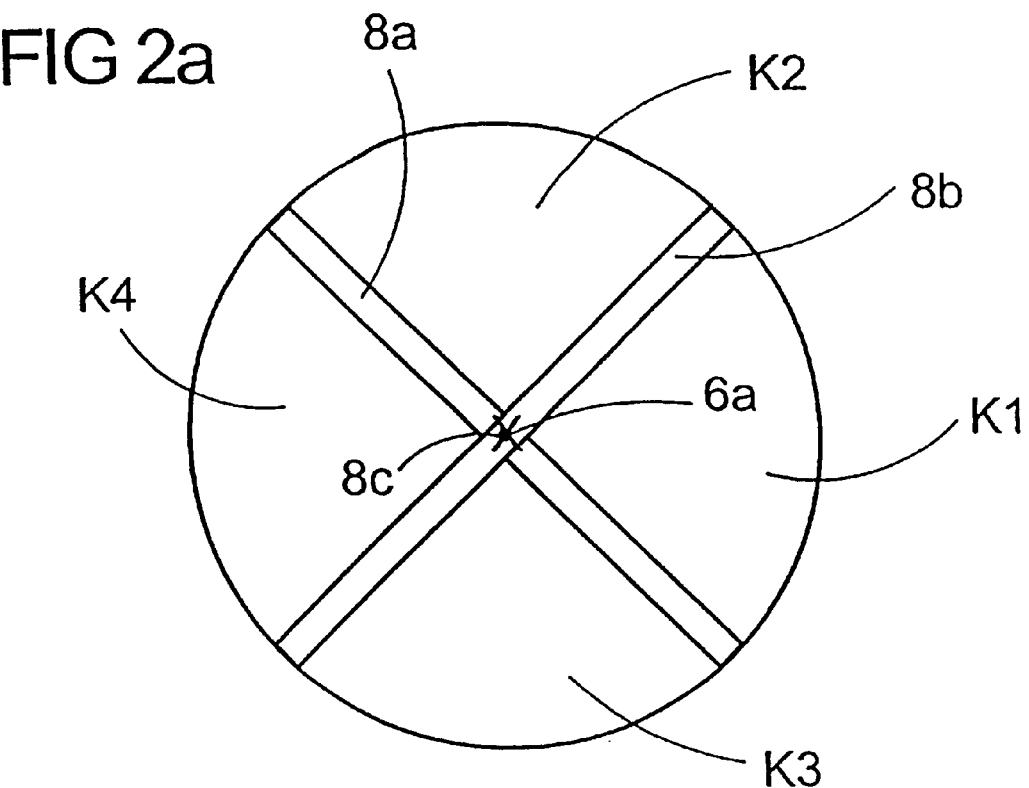
FIG. 2a in a cross-sectional diagram shows the essentially cylindrical passage through the valve with a pair of intersecting walls according to the invention.
Figure 2B:
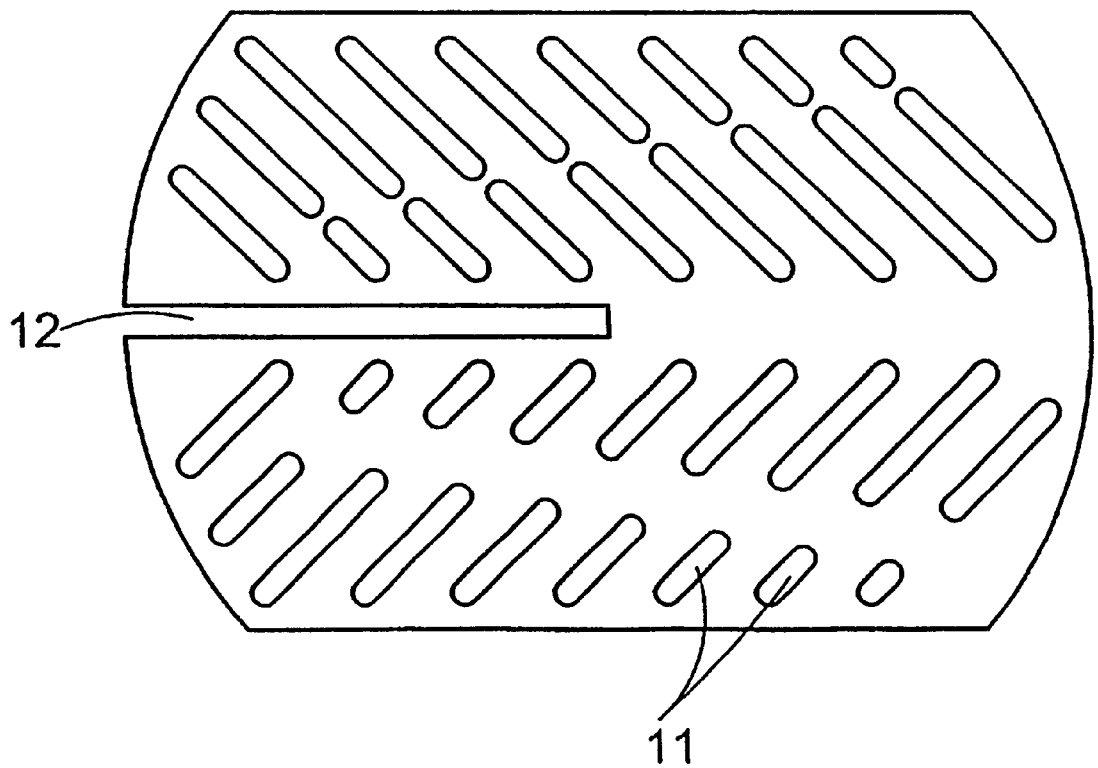
FIG. 2b shows one such wall.
Figure 3A:
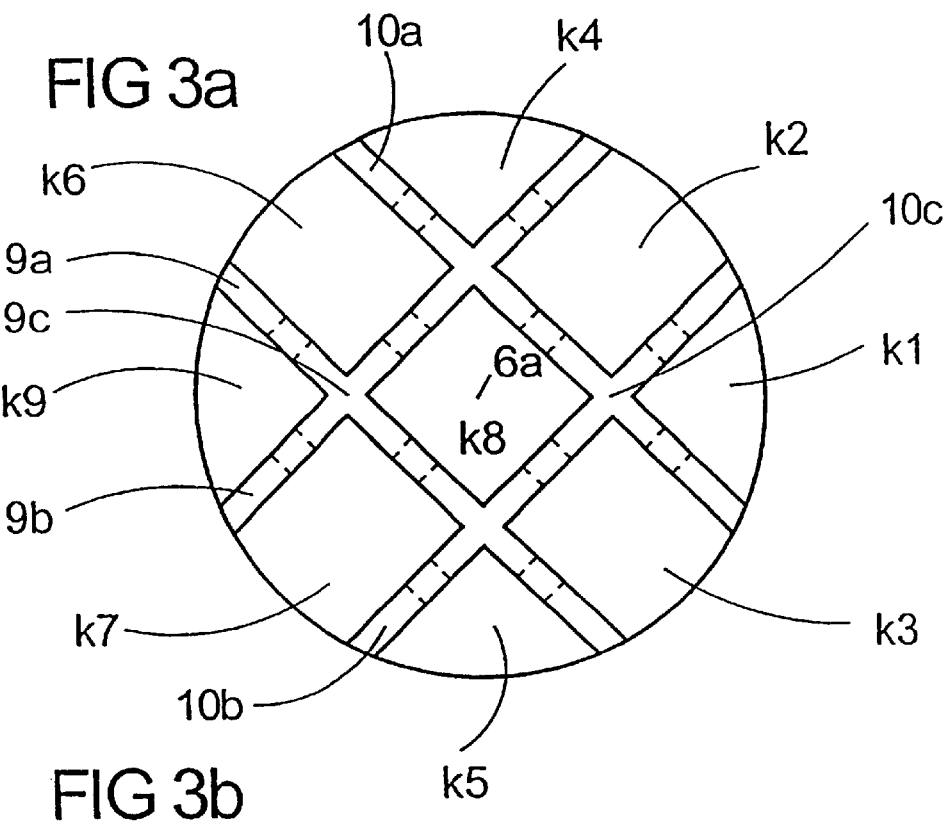
FIG. 3a, like FIG. 2a, shows a passage with two pairs of walls intersecting one another in pairs.
Figure 4:
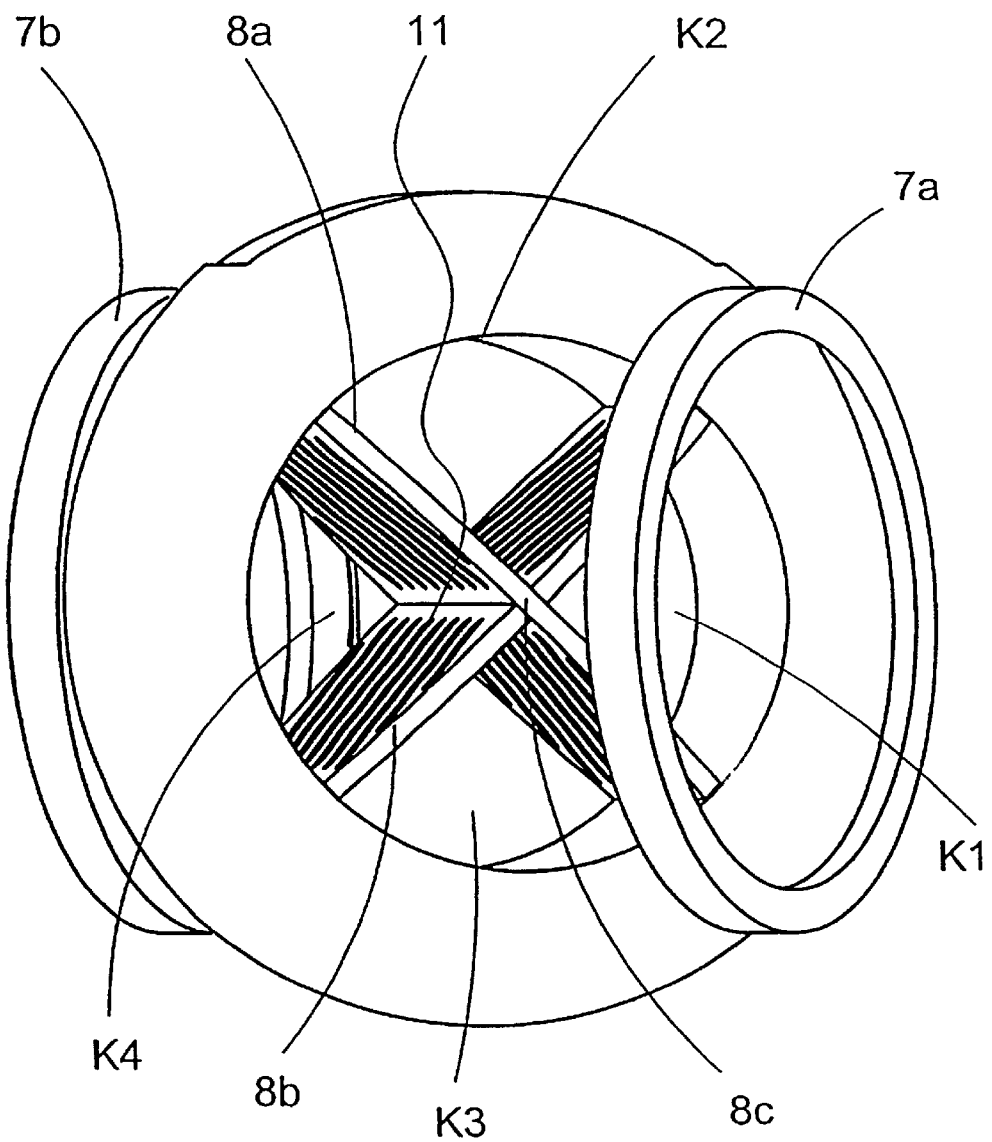
FIG. 4a, with a diagram of a valve body in perspective view, illustrates how the through-flow through the valve body passage occurs with four walls arranged therein.

According to the invention at last one pair of intersecting walls 8a, 8b, see FIG. 2a, and 9a, 9b and 10a, 10b see FIG. 3a, is arranged in the passage 6. The construction of a pair of walls, which as will be seen from FIGS. 2a and 4 are arranged like a cross in the passage 6, will now first be explained in more detail with reference to the FIGS. 2a, 2b and 4. The space in the passage 6 is divided up by the walls 8a, 8b into four chambers K1, K2, K3 and K4. The said chambers are located so that the chamber K1 lies nearest to the inlet 3 and the chamber K4, which is situated directly opposite the chamber K1, lies nearest to the outlet 4. The walls 8a, 8b are identical and for joining them together are provided with a slit 12, so that they can be inserted into one another. Fitted into the passage 6, the line of intersection 8c of the walls 8a, 8b coincides with the centre line 6a of the passage. As will be seen from FIG. 2b, the walls 8a, 8b are provided with through-slits 11, inclined in relation to the centre line 6a, preferably in such a way that the projected lines of the slits on two successive walls in the direction of flow form a right angle with one another.

As will already have become clear, when the valve body is turned in the opening direction, the following happens:

As the opening movement progresses, an increasingly larger connection is opened between the inlet 3 and the chamber K1 and correspondingly between the chamber K4 and the outlet 4. Initially therefore, a medium flows into the chamber K1, is forced through the slits 11 in the walls 8a, 8b into the chambers K2 and K3 in two essentially equal flows. The said flows are recombined in the chamber K4 after again passing the slit openings 11 in the walls that lie between the chamber K4 and the chambers K2 and K3 respectively. The person skilled in the art will appreciate that this results in pressure gradients, viz.:

1. At the passage of the medium from the inlet by way of a small opening and into the chamber K1.
2. At the passage of a half-flow through the slits from the chamber K1 to the chamber K2 or at the passage of the other half-flow through the slits from the chamber K1 to the chamber K3.
3. At the passage of the medium half-flows from the chambers K2 and K3 to the chamber K4.
4. At the meeting of the medium half-flows in the chamber K4, and
5. At the passage of the medium through a small opening between the chamber K4 and the outlet 4.

As the valve is increasingly opened, the effect of the intersecting walls 8a, 8b will diminish to an extent such that when the valve is fully open the effect is negligible. The valve can therefore absorb very large pressure gradients at small opening angles and still have great capacity when the valve is fully open. This corresponds, moreover, to the characteristics of most process systems, in which a pump pressure falls with increasing capacity, just as the pressure gradient in fixed valves and pipes increases with an increased flow of medium. The fact that the walls 8a, 8b in the fully open valve divide up the flow of medium through the valve into four essentially equal flows gives the valve very good characteristics due to the symmetrical flows.

Figure 3B:
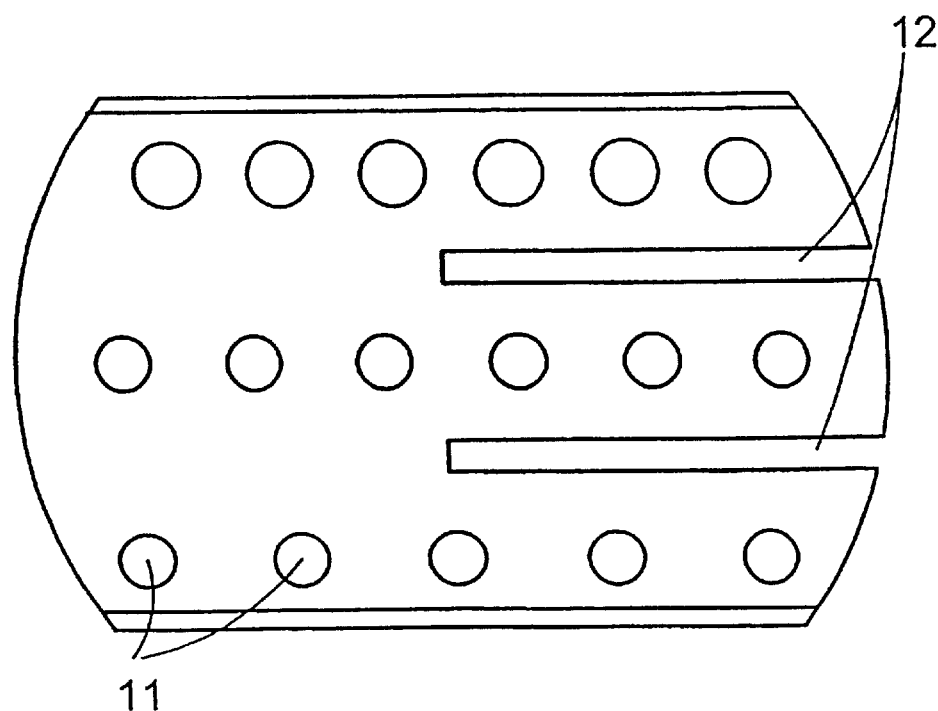

In the embodiment according to FIG. 3a of the device according to the invention there are, as stated, two pairs of intersecting walls, that is 9a 9b and 10a, 10b, which as will be seen from FIG. 3b are provided with circular through-bores 11' and slits 12 in order to permit assembly as indicated in FIG. 3a. The pairs of walls 9a, 9b and 10a, 10b are symmetrical with their respective lines of intersection 9c, 10c located on either side of the centre line 6a of the passage 6. The passage is divided up by the walls into nine chambers, that is chamber k1, which lies nearest to the inlet 3, chambers k2–k7, chamber k8, which lies in the centre of the passage 6, and chamber k9, which lies nearest to the outlet 4. For reasons of symmetry the flows of medium in the chambers k2, k3, k6 and k7 are essentially equal and in the main half the size of the flows in the chambers k1 and k9.

At a small opening angle the inlet 3 connects solely with the chamber k1 and the outlet 4 with the chamber k9. The conditions are similar to what has already been explained in connection with FIG. 2a and FIG. 4, but it must be noted that in the embodiment with two pairs of intersecting walls according to FIG. 3a there are more points of constriction than in the embodiment with one pair of intersecting walls according to FIGS. 2a and 4.

The constriction may naturally be adjusted by varying the number of openings in the walls defining the chambers and/or the size of the said openings. It will also be apparent that the valve body need not necessarily be spherical, and that the invention is also applicable in a spherical sector valve or in a cylindrical/conical throttle valve, provided that the passage is essentially cylindrical.

It will be realised that the device according to the invention is also advantageous in valves for regulating gas or steam flows.

What is claimed is:

1. Device in a valve (1) comprising a valve housing (2) with inlet (3) and outlet (4) preferably arranged directly opposite one another on opposite sides of the housing (2) and in the valve housing (2), between the inlet (3) and the outlet (4), a valve body (5), provided with an essentially cylindrical passage (6) and pivotally mounted in the housing (2) so that with the valve (1) in the fully open position the passage (6) together with the inlet (3) and outlet (4) lie in line with one another, essentially plane walls, defining chambers between them and provided with through-openings (11; 11') being arranged in the passage (6), and the inlet, at the commencement of the valve opening movement, connecting solely with one chamber, which via wall openings and intermediate chambers connects with the chamber opposite and the latter with the outlet, with more and more chambers and finally all chambers being made to connect with the inlet and the outlet respectively during the successive opening sequence of the valve, characterised in that the device comprises at least one pair of intersecting walls (8a, 8b; 9a, 9b, 10a, 10b), which are located in the passage (6), so that two opposing chambers (K1,K4;k1,k9) situated nearest to the inlet and the outlet respectively lie symmetrically in relation to a centre plane, in which the central axis (6a) of the passage is situated during the rotational movement of the valve body (5) between the open and the closed position and vice-versa, so that a flow of medium flowing into the chamber (K1; k1) lying nearest to the inlet by way of the openings (11; 11') in the walls (8a, 8b; 9a, 9b, 10a, 10b) is divided up into a plurality of medium flows, which are combined in the chamber (K4; k9) situated nearest to the outlet, resulting in a pressure gradient.

2. Device according to claim 1, characterised in that the device has two pairs of intersecting walls (9a, 9b, 10a, 10b), which are in parallel pairs and the lines of intersection (9c, 10c) of which are situated on either side of and parallel with the centre-line (6a) of the passage (6).

3. Device according to claim 1, characterised in that the openings (11) are slit-shaped.

4. Device according to claim 3, characterised in that the slits are uniformly inclined in relation to the central axis of the passage, preferably in such a way that in the case of two adjacent walls they form a right angle with one another.

5. Device according to claim 1, characterised in that the openings (11') are circular ducts.

6. Method in a valve (1) with a valve housing (2) with a valve body (5), pivotally mounted therein and with an essentially cylindrical passage (6), which with the valve (1) in the fully open position lies in line with inlet (3) and outlet (4) located on opposite sides of the housing, characterised in that at least one pair of intersecting, essentially plane walls (8a, 8b; 9a, 9b, 10a, 10b) are located in the passage (6) and are provided with through-flow openings (11; 11'), the walls (8a, 8b; 9a, 9b, 10a, 10b) being oriented so that two opposing chambers (K1, K4; k1–k9), defined by intersecting plane walls and by the cylindrical wall of the passage, are situated symmetrically in relation to the inlet (3) and the outlet (4), a flow of medium being introduced into the chamber (K1; k1) situated nearest to the inlet to be divided up via the openings (11; 11') in the walls (8a, 8b; 9a, 9b, 10a, 10b) into a plurality of medium flows so as to produce a pressure gradient, which are then combined in the chamber (K4; k9) situated nearest to the outlet.

7. Method according to claim 6, characterised in that two pairs of intersecting walls (9a, 9b, 10a, 10b) are located with walls in parallel pairs and that these are aligned so that the intersecting walls or lines of intersection (9c, 10c) are located on either side of and parallel with the centre-line (6a) of the passage.

* * * * *